(12) United States Patent
Koeping et al.

(10) Patent No.: US 11,579,044 B1
(45) Date of Patent: Feb. 14, 2023

(54) SYSTEM AND METHOD FOR BEARING DEFECT AUTO-DETECTION

(71) Applicant: Aktiebolaget SKF, Gothenburg (SE)

(72) Inventors: Lukas Koeping, Würzburg (DE); Allan Thomson, 8LX Lanark (GB); Maksym Boreiko, Kiev (UA)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/540,446

(22) Filed: Dec. 2, 2021

(51) Int. Cl.
G01M 13/045 (2019.01)
G06N 20/00 (2019.01)
G06K 9/62 (2022.01)

(52) U.S. Cl.
CPC ......... G01M 13/045 (2013.01); G06K 9/6221 (2013.01); G06N 20/00 (2019.01)

(58) Field of Classification Search
None
See application file for complete search history.

(56) References Cited

U.S. PATENT DOCUMENTS

2022/0057295 A1   2/2022  Thomson
2022/0057296 A1*  2/2022  Thomson ............... G01H 1/003

\* cited by examiner

*Primary Examiner* — Raul J Rios Russo
*Assistant Examiner* — Carl F. R. Tchatchouang
(74) *Attorney, Agent, or Firm* — Garcia-Zamor Intellectual Property Law; Ruy Garcia-Zamor; Bryan Peckjian

(57) ABSTRACT

A method for performing bearing defect auto-detection provides an algorithm for processing condition monitoring data including vibration harmonics of at least one bearing coupled to a rotatable shaft, the bearing having an inner and an outer ring. The algorithm is used to confirm with high degree of confidence that a bearing defect is present or not.

25 Claims, 5 Drawing Sheets

SYSTEM AND METHOD FOR BEARING DEFECT AUTO-DETECTION

BACKGROUND

A train with all its axles fitted with the same axle-box design can have installed bearings from different manufacturers, which even though they have the same space envelope and "capacity" do often have differing bearing defect frequencies due to slight changes in their internal geometry. Managing which bearing is installed on which axle-box with for example, with @ptitude Observer (@O) manufactured by Aktiebolaget SKF with their principal place of business at 41550 Goteborg, Sweden and updating a database in a timely fashion is costly with respect to man-hours and prone to errors.

One type of system, manufactured by Aktiebolget SKF, with their principal place of business at 41550 Goteborg, Sweden, entitled "Insight Rail System" utilizes GPS linear speed and wheel diameter to determine the shaft rpm values for each measurement, however during the life of a rail wheel set the wheel profiles suffer from wear, dents, flats and fatigue squats (spalls) and therefore require reprofiling on condition or at regular intervals. The reprofiling is done by turning or grinding and each time reduces the diameter of the wheel (both wheels on the same axle are always kept at the same diameter) hence during the life of a wheelset its diameter is reduced generally by more than 10% with respect to when new. Managing individual axle wheel diameters, initial (on Insight installation) and after each reprofiling, and then updating the @ptitude Observer (@O) database in a timely fashion is costly with respect to man-hours and also prone to errors.

Often an Insight Rail system, manufactured by Aktiebolaget SKF is installed on a train whose bearings are part way through their service period hence the possibility exists that one or more bearings already have spalled to some degree, so it needs to detect bearing spalls without needing a learning period. Unlike the @O Protean systems manufactured by Aktiebolaget SKF, with their principal place of business at 41550 Goteborg, Sweden, which both require a "learning" period with a "healthy" bearing to establish trend characteristics and/or alarm thresholds.

SUMMARY

According to one or more non-limiting embodiments, a method is provided to perform a bearing defect auto-detection. The method comprises the steps of receiving, by a processor from one or more sensors, condition monitoring data, the condition monitoring data including vibration harmonics of at least one bearing coupled to a rotatable shaft, the bearing having an inner and an outer ring, the method further including; a) receiving the vibration data previously or sequentially transformed into the frequency domain and are ultimately provided as magnitude and frequency arrays, along with an approximate shaft speed in RPM or RPS, b) applying a peaks determination method that determines individual peaks from background noise, and the peak true amplitudes and their exact peak center frequencies, wherein the exact frequency and amplitude of each possible peak is stored into an array, c) identifying all feasible whole number sub-orders of each peak up to a predefined order number including the peak itself which fall into a specific range of target fundamental frequencies ranges, one for each defined defect type and storing those peaks along with their harmonic number and their theoretical fundamental as order arrays, d) clustering the theoretical fundamental frequencies that fall within each specific target range are clustered by one or more of many methods, the theoretical fundamental frequencies with a predefined cluster dimension limit and those clusters having acceptable clustering characteristics by number peaks in them and/or the tightest cluster dimensions are organized into groups and all others as outliers, and the groups stored in orders arrays, and e) identifying all peaks from the original list that may be feasible sidebands components of the peaks identified in step d), which have theoretical fundamental frequencies that fall within each specific target range are clustered by one or more of many methods, the theoretical fundamental frequencies with a predefined cluster dimension limit or tolerance and those clusters having more than a predefined number peaks in them are organized into groups and all others as outliers, and the groups stored in orders arrays, and f) applying a clustering method to their base delta frequencies with a predefined cluster dimension limit or tolerance and those clusters having acceptable clustering characteristics by number peaks in them and/or the narrowest cluster dimensions is organized into sideband groups and all others as outliers, wherein the sideband are groups stored in arrays with references to their respective center frequency peak from the orders arrays.

According to a second aspect, the method provides grouping patterns for each inner ring or outer ring bearing defect (or other defect types).

According to a third aspect, the method provides determining condition indicators. Where the most feasible group can be then selected by (a) correlation with weighted pattern components, (b) presence or not of components (c) RSS of group components (d) pattern recognition method on each group.

According to a further aspect, the method provides creating and using group derived condition indicators and features from one to many ranges in machine learning models with predetermined supervised, semi-supervised and un-supervised models for the application class so that defects can be identified with the first measurements and/or continuously learning and developing models specific to that measurement point or specific application (many measurement points.

According to a further aspect, the method further provides converting the magnitude and frequency arrays to an Enveloped Acceleration.

According to a further aspect, the method further provides dividing each peak frequency by a number from 1 to the number of harmonics to be included in turn to determine all sub-feasible theoretical fundamental frequencies.

According to a further aspect, the method further provides subtracting each peaks' frequency identified by every other peaks' frequencies in turn and dividing the absolute of the result by number 1 to the number of sidebands to search for to identify all feasible sideband peaks.

According to a further aspect, the method further provides selecting only the group having the (a) most peaks and/or (b) the narrowest cluster dimension tolerance and/or (c) best harmonic peak presence pattern as being representative of the most probable symptom related to that defined defect type and is stored as arrays of group components.

According to a further aspect, the method further provides selecting only the sideband group having the (a) most peaks and/or (b) the narrowest cluster dimension tolerance and/or (c) best sideband peak presence pattern as being representative of the most probable sidebands related to that specific defined defect type and is stored as arrays of sideband components associated with that specific group.

According to a further aspect, the method further provides applying a noise carpet filter to filter noise from of the frequency spectrum to remove unwanted spectral noise is accomplished by keeping only those components+10 dB above the local spectral carpet level.

According to a further aspect, the method further provides identifying the peaks from the noise filtered spectrum, and then a quadratic peak interpolation method is performed on the unfiltered spectrum that identifies the exact frequency as orders of presumed shaft speed and amplitude of each possible peak and stores them into an array, the result creating normalized arrays of Peak Frequencies and Peak Amplitudes.

According to a further aspect, the method further provides removing known mechanical frequency peaks using a module leaving a set of frequencies that include the bearing defect frequency components.

According to a further aspect, the method further provides determining with a funds in band function if each peak itself or an exact sub-order of it falls within the frequency range of fundamental frequencies of interest (FunL→FunH) creating a new array of fundamentals, harmonic number and original indices, those with their fundamentals that group together within a prespecified or learn tolerances are grouped as "orders" for that specific fundamental, then a Sides in Band function is applied, and for the selected group(s) for each order in that group each possible peak in the original array is checked to see if its delta-frequency wrt that order is or has a sub-order within the sideband range.

According to a further aspect, the method further provides determining the learned tolerances with artificial intelligence.

According to a further aspect, the method further provides associating with a clustering orders sub-algorithm which frequency members belong within a frequency group According to a further aspect, the method further provides applying an OrdCIs sub-algorithm to determine an RSS of each group's orders and some order peak presence values and mean fundamental frequency.

According to a further aspect, the method further provides applying a SideCIs sub-algorithm to determine the RSS of each group's sidebands and also some sidebands peak presence values and mean sideband frequency.

According to a further aspect, the method further provides applying a groupCIs sub-algorithm to determine the group RSS and the percentage of band relative CI value.

According to a further aspect, the method further provides that the search range for the fundamental frequency is for a first iteration centered around the expected frequency of a known mechanical vibration component and utilizing a low number of harmonics, then by clustering the results the most feasible cluster is used to calculate a significantly narrower search range and the number of harmonics increased for a second iteration, from which with or without the option of further clustering the identified peaks are removed from the peaks arrays prior to iterating for defect frequencies.

According to a further aspect, the method further provides that a test for ignore sides includes a) the group has at least 2 "first" sideband components, and/or b) the group has at least 1 "first" sideband component AND 2 "second" sideband components.

According to a further aspect, the method further provides employing a Group Scalar Condition Indicator method to group patterns, where each measurement is traceable to a specific node and/or bearing and a timestamp along with the estimated shaft speed (RPM or Hz), non-specific measurement derived quantitative and qualitative scalar CIs are determined from two sources, first a waveform; such as but not limited to RMS, True-Peak, True-Peak2Peak, Crest Factor, Kurtosis, Skewness, % sinusoidal/harmonic activity, and two the spectrum; such as but not limited to RSS of various fixed bands as absolute and/or normalized to whole spectrum RSS, spectral Kurtosis, spectral Skewness, non-specific spectral harmonic indicator.

According to a further aspect, the method further provides employing a Search Band Scalar CIs method to group patterns, where each measurement has multiple search bands, to search for defect symptoms, where each search band provides an absolute RSS value of the spectral components within that band based on the speed provided, in effect a speed following band, and where a band RSS sub-algorithm is applied to calculate the RSS of the spectral band of interest as derived from the speed and bearing ranges and numbers of orders and sidebands.

According to a further aspect, the method further provides employing a Vector CIs method to group patterns, where for each identified group within a measurement, several CIs are extracted.

According to a further aspect, the method further provides using the most feasible group components to produce the relevant Condition Indicators both quantitative and qualitative which along with its fundamental and sideband frequencies is passed onto a (1) existing "post-sweep" logic with Design of Experiment derived parameters, (2) a "decision logic" with engineered or AI/ML learnt parameters or (3) AI or ML with trending or "pattern recognition" methods.

According to a further aspect, the method further provides that each peak can be assigned only to a one and only one group, and named as "most feasible group," where this group is selected among others by a) the most probable combination of harmonics within the group and/or b) the fundamental being rotational speed frequency or other mechanical frequency c) a lower fundamental frequency, and where after selecting of the most feasible group, peaks assigned to this group are removed from other groups.

According to a further aspect, the method further provides that the frequencies are kept absolute to identify group patterns with static electrical fundamental frequencies and remove them from the peak arrays to keep only the speed following component, where when having multiple measurements with a varying rotational speed, only groups that are close to expected static noise frequencies are selected, where if such groups were detected in M out of N measurements, then those groups are considered as a static noise and can be removed from the further processing, and where the regular processing is then applied on the filtered data.

According to a further aspect, the method further provides that the fundamental frequency ranges for group identification start at a low frequency and are incrementally increased in steps where the range maximum does not exceed twice the range minimum and the next range step minimum does not exceed the previous maximum, and the peaks that satisfy group inclusions are removed from the peak arrays before the next range increment as to remove harmonics from lower fundamental frequencies being mistaken as belonging to a group with a higher fundamental frequency.

According to one or more non-limiting embodiments, Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments herein relate to a functionality for a proposed method for Auto Detection of bearing spall defects on railway axle-box bearings without the need to know the exact bearing designation (or defect frequencies) or have accurate shaft speed. The method includes "Reverse Sweeping" and outputs for multiple identified patterns are disclosed. With the right parameters the algorithm is applicable to rail monitoring systems and other industries not knowing the exact bearing designation (or defect frequencies) or have accurate shaft speed. A sub-algorithm or module typically includes software that executes a specific instruction set. However, one skilled in the art will recognize that a specific instruction set may also be performed by hardware or a combination of software and hardware.

The word "method" is used to describe the implementation of various functions throughout this paper. A method may provide a number of different ways to carry out the intended function and are not meant to be limiting.

Figure 1:
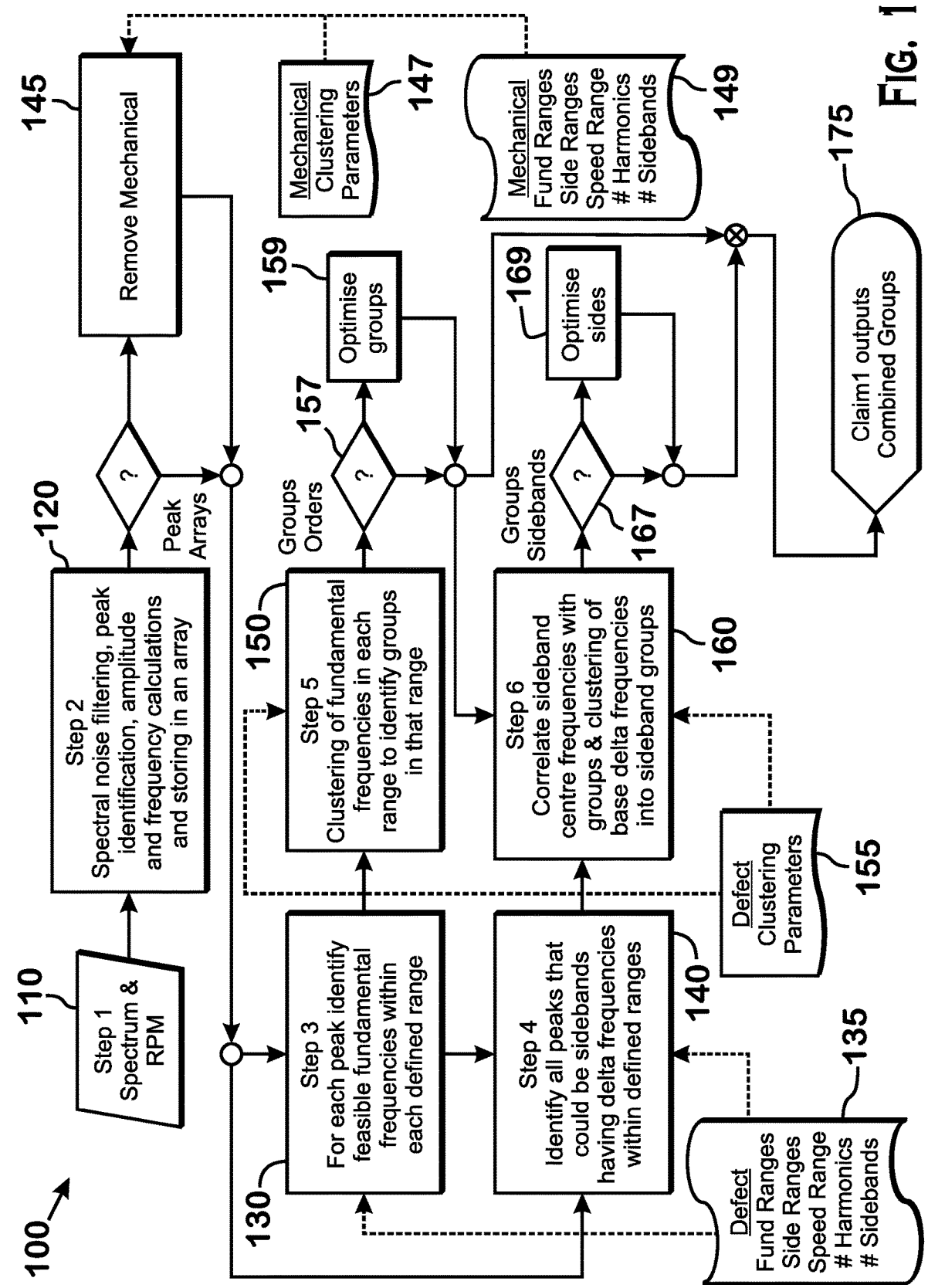
FIG. 1 depicts a flow diagram illustrating an example core algorithm in accordance with one or more embodiments.

FIG. 1 depicts a flow diagram illustrating an algorithm 100 that frameworks the functionality for a proposed method for Auto-Detection of bearing spall defects on railway axle-box bearings without the need to know the exact bearing designation or defect frequencies) or have accurate shaft speed. The Auto-Detection algorithm may be executed on a processor 102 (see FIG. 2) or other computer framework comprising and/or employing any number and combination of computing device and networks utilizing various communication technologies, as described herein. The computer framework can be easily scalable, extensible, and modular, with the ability to change to different services or reconfigure some features independently of others. The algorithm may be a computer executable program or computer executable product.

Figure 2:
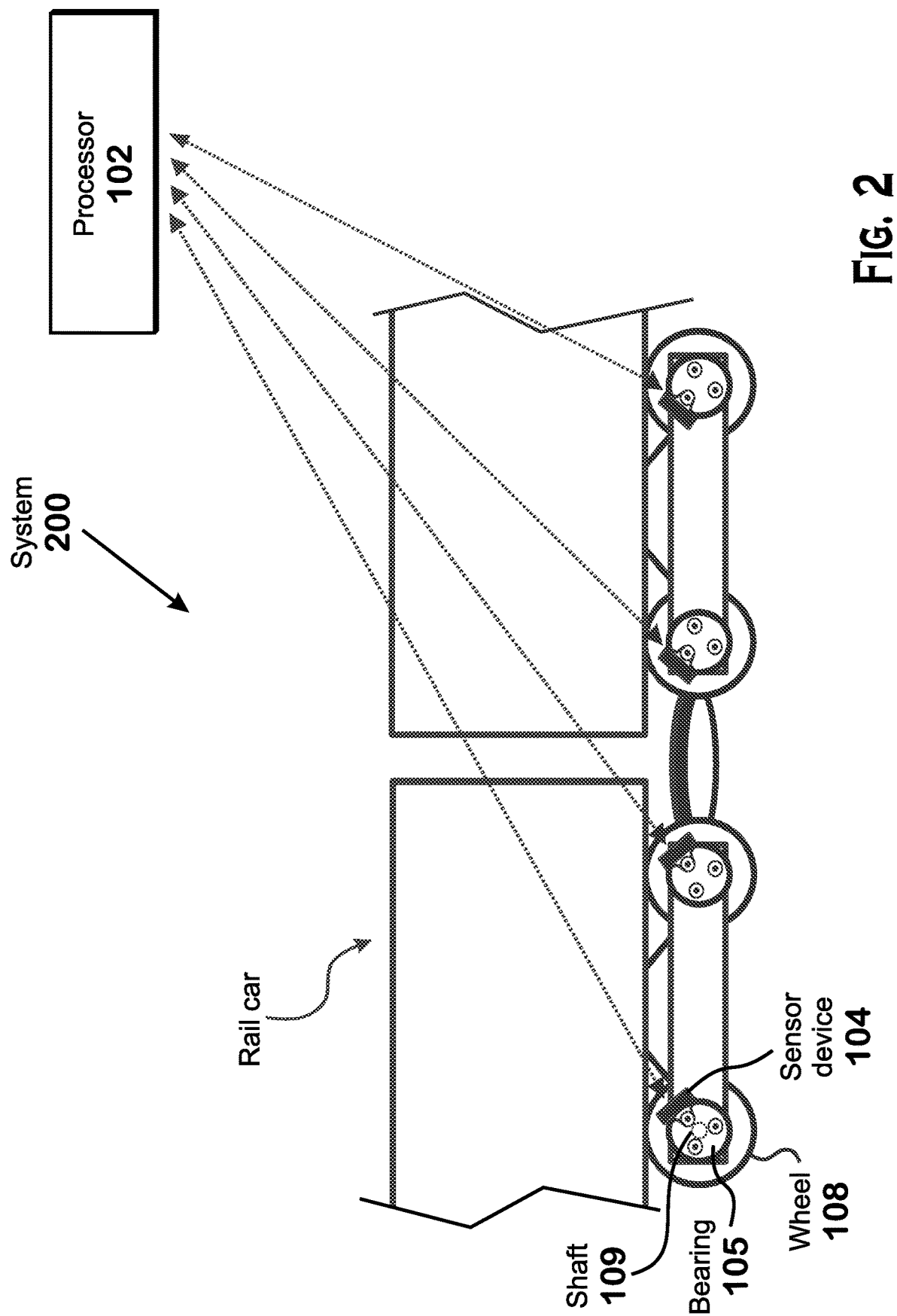
FIG. 2 depicts a schematic diagram of a basic system 200 for carrying out the function of the proposed core algorithm in accordance with one or more embodiments.

FIG. 2 depicts a schematic diagram of a basic system 200 for carrying out the function of the proposed method that includes a processor 102 and one or more sensors 104 connected to at least one bearing 106 mounted upon a rail wheel set 108.

In a sub-algorithm module 110, condition monitoring data including vibration harmonics of the at least one bearing 105 coupled to a rotatable shaft 109 are received by the processor 102. The vibration data, previously or sequentially transformed into the frequency domain are processed into magnitude and frequency arrays. This includes an approximate shaft speed in RPM or RPS.

In a sub-algorithm module 120, a peaks determination sub-algorithm/module is applied. The peaks determination sub-algorithm determines individual peaks from background noise, and the peak true amplitudes and their exact peak center frequencies. The exact frequency and amplitude of each possible peak is stored into an array. Here, each peaks' frequency identified is divided by every other peaks' frequencies in turn. The absolute value of the result is divided by number 1 to the number of sidebands to search for in order to identify all feasible sideband peaks.

Whatever format the condition monitoring data is supplied in, it often is converted to an Enveloped Acceleration which is normally done by an acquisition system and then into a Spectrum preferably with Peak-to-Peak scaling and using the Hanning window prior to an FFT. The FFT results are converted to "Magnitude" and the spectrum truncated to Number Bins and with a spectral FMax of (waveform sample rate sps)/2.56. For example, a waveform having 4096 samples acquired at 2560sps will produce a spectrum of 1601 bins (including the Zero bin) with a FMax of 1000 Hz (last bin).

To improve identification of spectral peaks, it is advantageous to Zero all spectral components considered to be in or close to the noise carpet and only keep those significantly above the carpet for the pattern sweep correlation. A filter threshold 10 dB and above yields good results for removing unwanted noise. Here, a module for calculating the local carpet level and removing the "noise" components for the noise filtered spectrum is provided. This is achieved by going through the spectrum bin by bin, calculating the median using a number of bins either side of that specific bin corresponding to + and −1/32 of the number of spectral bins. If that specific bin has a value greater or equal to the median plus 10 dB (or median*3.16) its value is kept otherwise its value is zero.

For every NON-ZERO bin value in the noise FILTERED spectrum it is necessary to determine if it or within a bin spacing is representative of a "Peak" and calculate its exact frequency and amplitude by the Quadratic Peak Identification/Interpolation method using the UN-FILTERED spectrum to create arrays of (a) Peak Frequencies (PkHz) and (b) Peak Amplitudes (PkMags).

In a sub-algorithm module 130, all feasible whole number sub-orders of each peak up to a predefined order number including the peak itself that fall into a specific range of target fundamental frequencies ranges are identified. Here, each peak frequency is divided by a number from 1 to the number of harmonics to be included in turn to determine all subfeasible theoretical fundamental frequencies. One for each defined defect type are identified. The peaks are stored along with their harmonic number and their theoretical fundamental as orders arrays.

Parameters regarding the characteristics of defects 135 are stored in a separate database and may be accessed by sub-algorithm module 130. The defect information is related to each defect type defined, such as BPFO Ball (roller) Pass Frequency Outer-race and BPFI Ball (roller) Pass Frequency Inner-race.

Defect Fundamental frequency as order of running speed is defect specific. Examples may be 6.23 and 11.34, etc. A default/typical defect fundamental range as +/−% is <1% to 33%. A default/typical defect sideband base delta frequency as an order of running speed is 037, 1.0 etc. In addition, a default/typical defect sideband range as +/−% is <1 to 33. Also, a default/typical Orders of Fundamental (harmonics) range to include 3 to 100+. Finally, a default/typical Number of Sidebands to (either side) include is 0 to 10. As such, all of the defect information disclosed in this paragraph are accessed by the sub-algorithm module 130 in order to identify the defects.

In a sub-algorithm module 140, all peaks from the original list that may be feasible sidebands components of the peaks identified in subalgorithm module 130 are identified. The peaks that may be feasible sideband components are identified by those having a base delta frequency within specific range of target sideband frequencies ranges, one for each defined defect type, and up to a predefined sideband +/− delta orders to determine all feasible theoretical base delta sideband frequencies and storing those feasible sideband peaks along with the sideband number. The theoretical delta sideband frequency and the center peak ID index, that fall within each of the sideband target ranges are stored as sideband arrays. All of the characteristics regarding defects 135 disclosed in this paragraph may be accessed by the sub-algorithm module 140 in order to identify the feasible peaks.

In a sub-algorithm module 145 a remove mechanical function is performed to remove mechanical noise. This option is used to remove wheel noise components slotted between the Peak Arrays module 120 and the Fundamental peak processing modules 130 and 140. Only the group having the (a) most peaks and/or (b) a narrowest cluster dimension (tolerance) and/or (c) best harmonic peak presence pattern, is selected as being representative of the most probable symptom related to that defined defect type and is stored as arrays of group components. The remove mechanical function can be manually "enabled" or "disabled" or even be made to be dependent on the amount of wheel noise activity present.

The remove mechanical function 145 option obtains input from databases that contain parameters and characteristics which are common to all mechanical noise. A first input is received from a mechanical clustering parameters 147 module. In the mechanical clustering parameters 147 module, a default/typical range for the smallest acceptable cluster size in number of peaks lies in a range between 2-5. The mechanical order clustering limits as orders of running speed for a first iteration is approximately 0.01. Note: This default/typical range may vary in value and definition depending on clustering method used as many types of clustering methods may be used such as DBSCAN, OPTICS, Gaussian Mixture etc. The mechanical order clustering limits as orders of running speed for second iteration is for "distance between points" approximately 0.006. The second iteration default/typical range man also vary in value and definition depending on clustering method used. The mechanical sideband clustering limits as orders of running speed is approximately 0.01. The default/typical range may vary in value and definition depending on clustering method used.

A second input into the remove mechanical function 145 is received from a second remove mechanical 149 module. Here, a default/typical mechanical fundamental frequency as an order of running speed or shaft speed is 1. A default/typical defect fundamental range as +/−% is <1% to 33%. A default/typical defect sideband base delta frequency as an order of running speed is 037, 1.0, etc. In addition, A default/typical defect sideband range as +/−% is <1 to 33. A default/typical Orders of Fundamental harmonics range to include in a first iteration is 3 to 11. Further, A default/typical Orders of Fundamental harmonics range to include in a second iteration is 0 or up to 100+. Finally, A default/typical Number of Sidebands to (either side) include is 0 to 10. As such, all of the defect information disclosed in this paragraph are accessed by the remove mechanical function 145 in order to identify the mechanical defects.

In a sub-algorithm module 150, the peaks which have theoretical fundamental frequencies that fall within each specific target range are clustered by one or more of many methods. The theoretical fundamental frequencies with a predefined cluster dimension limit and those clusters having more than a predefined number peaks in them are organized into groups and all others as outliers, and the groups stored in orders arrays. A "group" within a measurement consists of spectral components (identified peaks) linked by either being near exact orders of a fundamental within the fundamental range of interest be it one of the peaks or theoretical and other spectral components all having a delta frequency to an "order" being near exactly the same and within the sideband range of interest.

In a sub-algorithm module 155, defect clustering parameters common to all of the defects defined are stored in a separate database and may be accessed by sub-algorithm module 150. A smallest acceptable cluster size in number of peaks is in a range between 2-5. Defect orders clustering limits as orders of running speed are approximately 0.005. Defect sideband clustering limits as orders of running speed are approximately 0.01. All of the characteristics regarding defect clustering parameters 155 disclosed in this paragraph, may be accessed by the sub-algorithm module 150 in order to identify the feasible peaks.

In a sub-algorithm module 157, a decision between forwarding the groups orders may or may not be optimized. If the groups orders are to be optimized in sub-algorithm module 159, only the groups having the (a) most peaks and/or (b) the narrowest cluster dimension (tolerance) and/or (c) best harmonic peak presence pattern, is selected as being representative of the most probable symptom related to that defined defect type and is stored as arrays of group components.

During optimization in sub-algorithm module 159 unwanted groups are removed from a potential group list stored in the arrays are removed. The groups to be removed are typically a subgroup of another group having a lower or higher fundamental frequency, such as but not limited to (a) majority of the order peaks in the group are present as orders in another group of lower fundamental frequency, (b) the peaks' orders are all multiples of either one of 2, 3 or higher, (c) a majority of the first few orders of the fundamental need to exist as peaks typically 2 out of the first 3 or 3 out of the first 5, etc.

In addition, during groups optimization 159 the order peaks that are in more than one group are identified. This is determined by one or more probability-based rules or model assessing the relationship of the peak with respect to the other peaks in the group, which group it is most likely to be from and remove it from the other groups. This includes but is not limited to if (a) the peak's specific fundamental frequency is closer to the mean of one groups fundamental frequency than the other, if (b) the peak's order in one group is lower than its order in the other.

In sub-algorithm module 160, it is determined which of the sidebands from the sideband arrays are related to center frequencies components that are present in a group components array and have delta sideband frequencies within the target sideband frequency range for that group defect definition. A clustering sub-algorithm is applied to their base delta frequencies with a predefined cluster dimension limit. Those clusters having more than a predefined number sidebands peaks in them are organized into sideband groups and all others as outliers. The sideband groups are stored in arrays with references to their respective center frequency peak from the orders arrays. All of the characteristics regarding defect clustering parameters 155 disclosed above, which are stored in a separate database are accessed by the sub-algorithm module 160 in order to identify the feasible peaks.

In a sub-algorithm module 167, a decision between forwarding the groups sidebands may or may not be optimized. If the groups sidebands are to be optimized in sub-algorithm module 169, only the sideband group having the (a) most peaks and/or (b) the narrowest cluster dimension (tolerance) and/or (c) best sideband peak presence pattern, is selected as being representative of the most probable sidebands related to that specific defined defect type and is stored as arrays of sideband components associated with that specific group.

During optimization 169, it is determined whether each sideband peak is also a peak present in another group by one or more probability-based rules or model. The rules include but not limited to (a) the peak is a sideband component in one group and an order component in the other (b) the peak is positioned at a lower sideband Delta frequency multiple in one group than the other, (c) the sideband peak's base Delta frequency is closer to the mean of one group than the other group, (d) the sideband peak is part of a larger cluster in one group than the other.

In addition, during sideband optimization it is determined if each sideband peak within a group is likely to be genuinely linked to that group by one or more probability-based rules or model. The rules include but not limited to (a) on the presence or not of its center peak which is an order peak within the same group, (b) if Delta frequencies of the sideband group are all multiples the base Delta frequency of either one of 2, 3 or higher, then the sidebands belong to another base delta frequency and if out of the defined sideband range or not deemed probable, remove the sideband peaks from the group.

After both the groups' orders are optimized 159 and the group sidebands are optimized 169 (or not) in their respective sub-algorithm modules, the two outputs are combined into one output containing the combined groups shown in a subalgorithm module 175. The output of the combined optimized groups provides one skilled in the art the necessary information in order to automatically detect bearing defects. That is, the core algorithm provides one the ability to separate the wheat from the chaff so to speak by providing patterns of linked spectral components from within each defined range of interest. At this point in the disclosure, the core function of the present invention has been disclosed.

Figure 3:
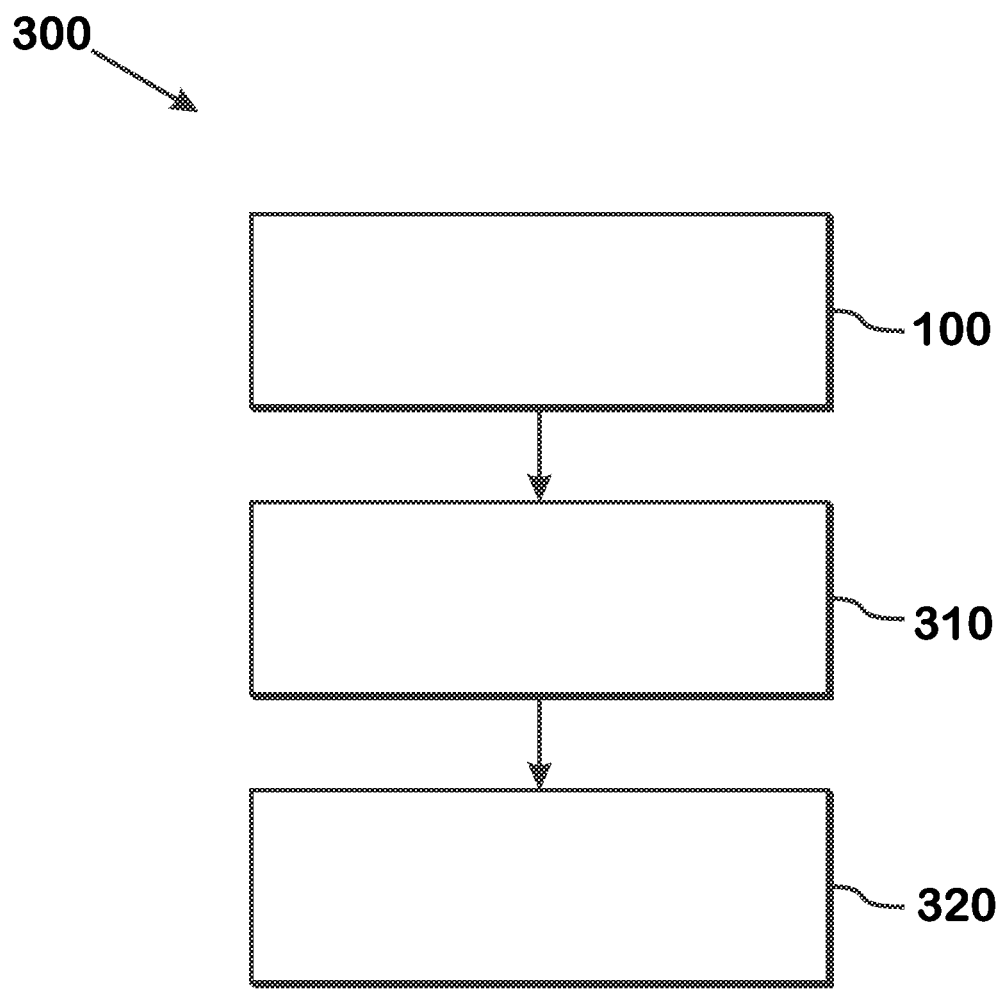
FIG. 3 depicts a flow diagram of a first application of the present invention.

Some applications of the core algorithm 100 will now be disclosed. FIG. 3 depicts an application 300 of the core algorithm 100 where the outputs are fed into block 310. In block 310, group scalar condition indicator (CIs) measurements are first identified. Each Scalar CIs measurement is traceable to s specific node and/or bearing and a timestamp along with the estimated shaft speed (RPM or Hz). Non-specific measurement derived quantitative and qualitative scalar CIs can be easily determined from two sources.

First the waveform, such as but not limited to RMS, True-Peak, True-Peak2Peak, Crest Factor, Kurtosis, Skewness, % sinusoidal/harmonic activity. Second, the Spectrum, such as but not limited to RSS (root mean square) of various fixed bands as absolute and/or normalized to whole spectrum RSS, spectral Kurtosis, spectral Skewness, non-specific spectral harmonic indicator.

In addition, search band scalar CI measurements are identified. Each Search Band Scalar CIs measurement can have multiple search bands, though currently only one is used to search for both BPFO and BPFI defect symptoms. If Roller defects were to be added to the monitoring list, then a search band for BSF and another for FTF symptoms would need to be included. Each search band provides an absolute RSS value of the spectral components within that band based on the speed provided, in effect a speed following band. Measurement date/time stamp, rpm and bandRSS. Waveform and spectral drives measurement CIs may also be included.

Further, for each identified group within a measurement several CIs are extracted. The "specified band" is derived from the theoretically lowest frequency component possible (i.e., 1st order minus 3 sidebands) to the highest (i.e. last order plus 3 sidebands) across the fundamental and sideband frequency ranges as derived in a BANDrss function. The BANDrss function to calculate the RSS of the spectral band of interest as derived from the speed and bearing ranges and numbers of orders and sidebands.

In block 320, the group CIs are calculated. The group CIs are calculated in three stages (functions). An OrdCIs function determines the RSS of each groups' orders (Orss) and some order peak presence values (OPreT, OPre3) and mean fundamental frequency (OFunF). A SideCIs function determines the RSS of each groups' sidebands (Srss) and also some sideband peak presence values (SPreT, SPre2) and mean sideband delta frequency (SbndF). A groupCIs function determines the group RSS value (Grss) and the percentage of band relative CI value (Gpob).

In addition, the group CIs may now be applied to Artificial intelligence and Machine learning models. First, predetermined supervised models for the application class may be applied so that defects can be identified with the first measurements. Continuously learning and developing models specific to that measurement point or specific application (many measurement points) capable of taking account of changing noise factors and new operating conditions may be applied.

A first approach is through a learning process carried out on categorized labelled datasets covering a broad set of fleets/applications and then applying the preconfigured models to all fleets/applications utilizing bearings that meet the criteria. This AI/ML approach is considered to be able to provide immediate defect detection within a few measurements even if the node is installed on a bearing that is already defective.

A second approach is through data driven anomaly detection based on each node/bearing in isolation. Although thought to be a reliable method for detection a transition from a healthy bearing state to a defective state concerns exist when a node is installed on a bearing that is already defective.

A combination of the first and second methods referenced above followed by ongoing optimization of the second method provides an algorithm according to the present invention that may be used to confirm with high degree of confidence that a bearing defect is present or not.

Teaching an AI/ML model with labelled data may be done in one of or both of the following approaches with respect to labelled data. 1) Each individual measurement from one or more datasets are labelled as to if they individually display the symptoms of a specific defect. 2) Labelling is done at a dataset level representative of a bearing with a specific defect.

Figure 4:
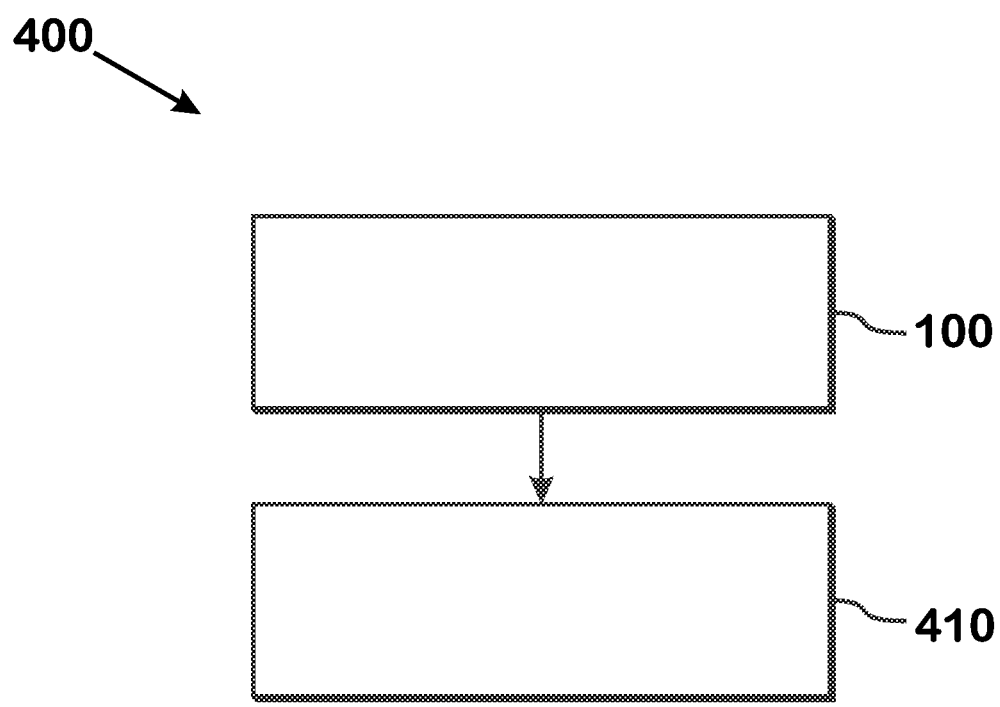
FIG. 4 depicts a flow diagram of a second application of the present invention.
Figure 5:
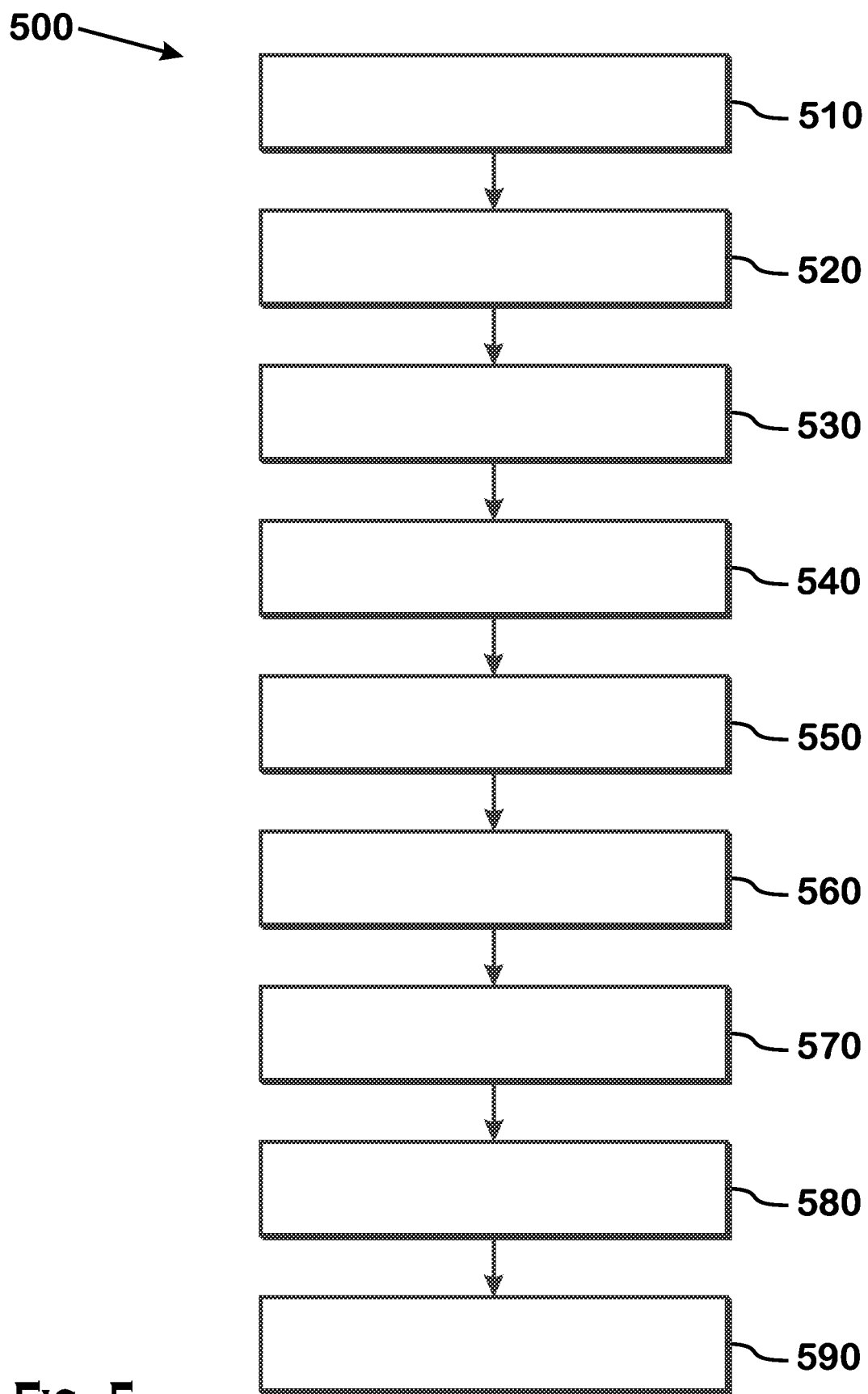
FIG. 5 depicts a process flow of the method steps required to carry out the function of the algorithm according to the present invention.

Another application of the core algorithm 100 will now be disclosed. FIG. 4 depicts an application 400 of the core algorithm 100 where the outputs are fed into block 410. Here, group patterns define the following for each bearing defect (Inner or Outer): fundamental component, none or a few harmonic components, none or a few sideband components having a delta frequency other than its fundamental (generally another fundamental). For the bearing defect patterns, three factors (for pattern construction) are defined:

the harmonics as a number of orders (including the fundamental)

the number of sidebands the fundamental frequency and mechanical frequency identifier for the sidebands.

The benefit of processing all the groups patterns together is that many will have components that are also present in another group's pattern but in reality, should only be allowed to be "present" in one group, therefore a decision process is required to determine into which group that component fits better and remove it from the other. In many cases the less suited group is likely to be "dismantled" to a point it cannot be considered a group anymore and is removed from the assessment process.

In addition, the groups patterns may now be applied to Artificial intelligence and Machine learning models. Here, predetermined learnt patterns for the application class (not only rail) so that patterns can be identified with the first measurements as defects or of other mechanical sources. Continuously learning and developing pattern models specific to that measurement point or specific application (many measurement points) capable of taking account of changing noise factors and new operating conditions may be applied.

A method for performing bearing defect auto-detection 500 will now be disclosed in association with FIGS. 1-5.

In a first step 510, the method provides receiving, by a processor from one or more sensors, condition monitoring data. The condition monitoring data includes vibration harmonics of at least one bearing coupled to a rotatable shaft. The bearing having an inner and an outer ring.

In a second step 520, the method provides receiving the vibration data previously or sequentially transformed into the frequency domain and are ultimately provided as magnitude and frequency arrays, along with an approximate shaft speed in RPM or RPS.

In a further step 530, the method provides applying a peaks determination method that determines individual peaks from background noise, and the peak true amplitudes and their exact peak center frequencies. The exact frequency and amplitude of each possible peak is stored into an array.

In another step 540, the method provides applying a peaks determination method that determines individual peaks from background noise, and the peak true amplitudes and their exact peak center frequencies. The exact frequency and amplitude of each possible peak is stored into an array.

In a next step 540, the method provides identifying all feasible whole number sub-orders of each peak up to a predefined order number including the peak itself which fall into a specific range of target fundamental frequencies ranges, one for each defined defect type and storing those peaks along with their harmonic number and their theoretical fundamental as order arrays.

In a step 550, the method provides clustering the theoretical fundamental frequencies that fall within each specific target range are clustered by one or more of many methods, the theoretical fundamental frequencies with a predefined cluster dimension limit and those clusters having acceptable clustering characteristics by number peaks in them and/or the tightest cluster dimensions are organized into groups and all others as outliers, and the groups stored in orders arrays.

In a further step 560, the method provides identifying all peaks from the original list that may be feasible sidebands components of the peaks identified in step 550, which have theoretical fundamental frequencies that fall within each specific target range are clustered by one or more of many methods. The theoretical fundamental frequencies with a predefined cluster dimension limit or tolerance and those clusters having more than a predefined number peaks in them are organized into groups and all others as outliers, and the groups stored in orders arrays.

In a next step 570, the method provides applying a clustering method to the base delta frequencies with a predefined cluster dimension limit or tolerance. Those clusters having acceptable clustering characteristics by number peaks in them and/or the narrowest cluster dimensions are organized into sideband groups and all others as outliers. The sideband are groups are stored in arrays with references to their respective center frequency peak from the orders arrays.

In a step 580, the method provides grouping patterns for each inner ring or outer ring bearing defect (or other defect types). Three factors for pattern construction are defined by 1) identifying the harmonics as a number of orders, 2) the number of sidebands, and 3) the fundamental frequency range and frequency range for the sidebands, wherein a fundamental component, none or a few harmonic components, none or a few sideband components having a delta frequency other than its fundamental comprise the possible grouped patterns.

In a step 590, the method further provides applying the grouped patterns against predetermined learnt patterns for the application class so that patterns can be identified with the first measurements as defects or of other mechanical sources. This is accomplished through continuous learning and development of the pattern models specific to that measurement point or specific application (many measurement points) capable of taking account of changing noise factors and new operating conditions.

In a further step, the method provides determining condition indicators. Here, the most feasible group is selected by (a) correlation with weighted pattern components, (b) presence or not of components (c) RSS of group components (d) pattern recognition method on each group.

In a further step, the method provides creating and using group derived condition indicators and features from one to many ranges in machine learning models with predetermined supervised, semi-supervised and un-supervised models for the application class so that defects can be identified with the first measurements and/or continuously learning and developing models specific to that measurement point or specific application (many measurement points) capable of taking account of changing noise factors and new operating conditions, and identifying defects with a high confidence level based on the algorithm being coded using a Compiler or Computer Resource with a Higher Level La, c) via machine learning, and using of an Artificial Intelligence algorithm to "Learn" which defects exist.

In another step, the method provides converting the magnitude and frequency arrays to an Enveloped Acceleration by a data acquisition system, and/or a Hanning window is performed on the data prior to the FFT, and/or an FFT or RFT is performed on data to generate spectral data, and/or the Magnitude of the FFT data is computed from the real and imaginary spectral components, "Magnitude"=SQRT (Real2+Imag2), and/or the spectrum is truncated.

In a next step, the method provides dividing each peak frequency at step 540 by a number from 1 to the number of harmonics to be included in turn to determine all sub-feasible theoretical fundamental frequencies.

In another step, the method provides subtracting each peaks' frequency identified in step 530 by every other peaks' frequencies in turn and dividing the absolute of the result by number 1 to the number of sidebands to search for to identify all feasible sideband peaks.

In a next step, the method provides selecting at step 560, only the group having the (a) most peaks and/or (b) the narrowest cluster dimension tolerance and/or (c) best harmonic peak presence pattern as being representative of the most probable symptom related to that defined defect type and is stored as arrays of group components.

In another step, the method provides selecting at step 570, only the sideband group having the (a) most peaks and/or (b) the narrowest cluster dimension tolerance and/or (c) best sideband peak presence pattern as being representative of the most probable sidebands related to that specific defined defect type and is stored as arrays of sideband components associated with that specific group.

In a step, the method provides applying a noise carpet filter to filter noise from of the frequency spectrum to remove unwanted spectral noise is accomplished by keeping only those components+10 dB above the local spectral carpet level, and wherein the rest are reduced to zeroes.

In a next step, the method provides identifying the peaks from the noise filtered spectrum. Then a quadratic peak interpolation method is performed on the unfiltered spectrum, and it identifies the exact frequency as orders of presumed shaft speed and amplitude of each possible peak and stores them into an array. The result creates normalized arrays of Peak Frequencies and Peak Amplitudes.

In a further step, the method provides removing known mechanical frequency peaks using a module leaving a set of frequencies that include the bearing defect frequency components such as the inner and outer ring of the bearing and the mechanical peaks result from the test fixture such as shaft speed rather than the bearing. Then a "Funds in Band" sub-algorithm is called twice to select array peaks that may have a sub-order and hence a theoretical fundamental frequency within a specified frequency band.

In another step, the method provides determining with a funds in band function determines if each peak itself or an exact sub-order of it falls within the frequency range of fundamental frequencies of interest (FunL→FunH) creating a new array of fundamentals, harmonic number and original indices. Those with their fundamentals that group together within a prespecified or learned tolerance are grouped as "orders" for that specific fundamental. Next, a Sides in Band function is applied. For the selected group(s) of each order in that group each possible peak in the original array is checked to see if its delta-frequency wrt that order is or has a sub-order within the sideband range.

In another step, the method provides determining the learned tolerances with artificial intelligence.

In another step, the method provides associating with the clustering orders sub-algorithm which frequency members belong within a frequency group. A dimensional cluster method performs removal of outsiders from the group. The groupings by specific tolerances can be achieved by (i) histograms of reducing bin sizes for one or more groups, (ii) clustering of reducing size by removal of outsiders for a single group, (iii) multiple clusters for multiple groups. The outputs of Clusterorders and/or Remove-Subs sub-algorithms are arrays of individual order components sorted into identifiable groups(s).

In another step, the method provides applying a OrdCIs sub-algorithm to determine an RSS of each group's orders and some order peak presence values and mean fundamental frequency. A SideCIs sub-algorithm is then applied to determine the RSS of each group's sidebands and also some sidebands peak presence values and mean sideband frequency. A groupCIs sub-algorithm is applied to determine the group RSS and the percentage of band relative CI value.

In another step, the method provides that the search range for the fundamental frequency is for a first iteration centered around the expected frequency of a known mechanical vibration component and utilizing a low number of harmonics, then by clustering the results the most feasible cluster is used to calculate a significantly narrower search range and the number of harmonics increased for a second iteration, from which with or without the option of further clustering the identified peaks are removed from the peaks arrays prior to iterating steps 510, 520, 530, 540, 550, 560 and 570 for defect frequencies.

In another step, the method provides that the test for ignore sides includes a) the group has at least 2 "first" sideband components, and/or b) the group has at least 1 "first" sideband component AND 2 "second" sideband components. The outputs of ClusterSides and/or IgnoreSides functions are arrays of individual sideband components sorted into the same group(s) of the order component which is their "center-frequency.

In another step, the method provides employing a Group Scalar Condition Indicator method to group patterns. Here, each measurement is traceable to a specific node and/or bearing and a timestamp along with the estimated shaft speed (RPM or Hz), non-specific measurement derived quantitative and qualitative scalar CIs are determined from two sources, first a waveform; such as but not limited to RMS, True-Peak, True-Peak2Peak, Crest Factor, Kurtosis, Skewness, % sinusoidal/harmonic activity, and two the spectrum; such as but not limited to RSS of various fixed bands as absolute and/or normalized to whole spectrum RSS, spectral Kurtosis, spectral Skewness, non-specific spectral harmonic indicator.

In another step, the method provides employing a Search Band Scalar CIs method to group patterns. Here, each measurement has multiple search bands, to search for defect symptoms. Each search band provides an absolute RSS value of the spectral components within that band based on the speed provided, in effect a speed following band. A band RSS sub-algorithm is applied to calculate the RSS of the spectral band of interest as derived from the speed and bearing ranges and numbers of orders and sidebands.

In another step, the method provides employing a Vector CIs method is employed to group patterns. For each identified group within a measurement, several CIs are extracted.

In another step, the method provides using the most feasible group components to produce the relevant Condition Indicators both quantitative and qualitative which along with its fundamental and sideband frequencies is passed onto a (1) "post-sweep" logic with Design of Experiment derived parameters, (2) a "decision logic" with engineered or AI/ML learnt parameters or (3) AI or ML with trending or "pattern recognition" methods.

In another step, the method provides at step 560, selecting each peak that can be assigned only to a one and only one group, and named as a "most feasible group". This groups is selected among others by a) the most probable combination of harmonics within the group and/or b) the fundamental being rotational speed frequency or other mechanical frequency c) a lower fundamental frequency. After selecting of the most feasible group, peaks assigned to this group are removed from other groups.

In another step, the method provides keeping the frequencies (i.e. in Hz or cpm) in order to identify group patterns with static fundamental frequencies (not speed-following e.g. electrical frequency) and remove them from the peak arrays to keep only the speed following component, as when it's frequency is close to the expected bearing defect frequencies and can be confusing. Having multiple measurements with a varying rotational speed, only groups that are close to expected static noise frequencies are selected. If such groups were detected in M out of N measurements, then those groups are considered as a static noise and can be removed from the further processing. Then, the regular processing is applied on the filtered data.

In another step, the method provides incrementally increasing the fundamental frequency ranges for group identification starting at a low frequency and are incrementally increased in steps where the range maximum does not exceed twice the range minimum and the next range step minimum does not exceed the previous maximum, and the peaks that satisfy group inclusions are removed from the peak arrays before the next range increment as to remove harmonics from lower fundamental frequencies being mistaken as belonging to a group with a higher fundamental frequency.

The present invention may be a system, a method, and/or a computer program product at any possible technical detail level of integration. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for performing bearing defect auto-detection comprising:
   receiving, by a processor from one or more sensors, condition monitoring data, the condition monitoring data including vibration harmonics of at least one bearing coupled to a rotatable shaft, the bearing having an inner and an outer ring, the method further including;
   a) receiving the vibration data previously or sequentially transformed into the frequency domain and are ultimately provided as magnitude and frequency arrays, along with an approximate shaft speed in RPM or RPS,
   b) applying a peaks determination method that determines individual peaks from background noise, and the peak true amplitudes and their exact peak center frequencies, wherein the exact frequency and amplitude of each possible peak is stored into an array,
   c) identifying all feasible whole number sub-orders of each peak up to a predefined order number including the peak itself which fall into a specific range of target fundamental frequencies ranges, one for each defined defect type and storing those peaks along with their harmonic number and their theoretical fundamental as order arrays, d) clustering the theoretical fundamental frequencies that fall within each specific target range are clustered by one or more of many methods, the theoretical fundamental frequencies with a predefined cluster dimension limit and those clusters having acceptable clustering characteristics by number peaks in them and/or the tightest cluster dimensions are organized into groups and all others as outliers, and the groups stored in orders arrays, and e) identifying all peaks from the original list that may be feasible sidebands components of the peaks identified in step d), which have theoretical fundamental frequencies that fall within each specific target range are clustered by one or more of many methods, the theoretical fundamental frequencies with a predefined cluster dimension limit or tolerance and those clusters having more than a predefined number peaks in them are organized into groups and all others as outliers, and the groups stored in orders arrays, and f) applying a clustering method to their base delta frequencies with a predefined cluster dimension limit or tolerance and those clusters having acceptable clustering characteristics by number peaks in them and/or the narrowest cluster dimensions is organized into sideband groups and all others as outliers, wherein the sideband are groups stored in arrays with references to their respective center frequency peak from the orders arrays.

2. The method according to claim 1, further comprising grouping patterns for each inner ring or outer ring bearing defect (or other defect types), wherein three factors for pattern construction are defined by 1) identifying the harmonics as a number of orders, 2) the number of sidebands, and 3) the fundamental frequency range and frequency range for the sidebands, wherein a fundamental component, none or a few harmonic components, none or a few sideband components having a delta frequency other than its fundamental comprise the possible grouped patterns.

3. The method according to claim 1, further comprising determining condition indicators, wherein selecting the most feasible group can be then selected by (a) correlation with weighted pattern components, (b) presence or not of components (c) RSS of group components (d) pattern recognition method on each group.

4. The method according to claim 2, further comprising creating and using group derived condition indicators and features from one to many ranges in machine learning models with predetermined supervised, semi-supervised and un-supervised models for the application class so that defects can be identified with the first measurements and/or continuously learning and developing models specific to that measurement point or specific application (many measurement points) capable of taking account of changing noise factors and new operating conditions, and identifying defects with a high confidence level based on the algorithm being coded using a Compiler or Computer Resource with a Higher Level La, c) via machine learning, and using of an Artificial Intelligence algorithm to "Learn" which defects exist.

5. The method according to claim 1, further comprising converting the magnitude and frequency arrays to an Enveloped Acceleration by a data acquisition system, and/or a Hanning window is performed on the data prior to the FFT, and/or an FFT or RFT is performed on data to generate spectral data, and/or the Magnitude of the FFT data is computed from the real and imaginary spectral components, "Magnitude"=SQRT(Real2+Imag2), and/or the spectrum is truncated.

6. The method according to claim 1, further comprising dividing each peak frequency at step c) by a number from 1 to the number of harmonics to be included in turn to determine all sub-feasible theoretical fundamental frequencies.

7. The method according to claim 1, further comprising subtracting each peaks' frequency identified in step b) by every other peaks' frequencies in turn and dividing the absolute of the result by number 1 to the number of sidebands to search for to identify all feasible sideband peaks.

8. The method according to claim 1, further comprising selecting at step e), only the group having the (a) most peaks and/or (b) the narrowest cluster dimension tolerance and/or (c) best harmonic peak presence pattern as being representative of the most probable symptom related to that defined defect type and is stored as arrays of group components.

9. The method according to claim 1, further comprising selecting at step f, only the sideband group having the (a) most peaks and/or (b) the narrowest cluster dimension tolerance and/or (c) best sideband peak presence pattern as being representative of the most probable sidebands related to that specific defined defect type and is stored as arrays of sideband components associated with that specific group.

10. The method according to claim 1, further comprising applying a noise carpet filter to filter noise from of the frequency spectrum to remove unwanted spectral noise is accomplished by keeping only those components+10 dB above the local spectral carpet level, and wherein the rest are reduced to zeroes.

11. The method according to claim 1, further comprising identifying the peaks from the noise filtered spectrum, and then a quadratic peak interpolation method is performed on the unfiltered spectrum, and it identifies the exact frequency as orders of presumed shaft speed and amplitude of each possible peak, and stores them into an array, and wherein the result creates normalized arrays of Peak Frequencies and Peak Amplitudes.

12. The method according to claim 1, further comprising removing known mechanical frequency peaks using a module leaving a set of frequencies that include the bearing defect frequency components such as the inner and outer ring of the bearing, wherein the mechanical peaks result from the test fixture such as shaft speed rather than the bearing, and wherein a "Funds in Band" sub-algorithm is called twice to select array peaks that may have a sub-order and hence a theoretical fundamental frequency within a specified frequency band.

13. The method according to claim 9, further comprising determining with a funds in band function if each peak itself or an exact sub-order of it falls within the frequency range of fundamental frequencies of interest (FunL→FunH) creating a new array of fundamentals, harmonic number and original indices, wherein those with their fundamentals that group together within a prespecified or learn tolerances are grouped as "orders" for that specific fundamental, wherein a Sides in Band function is applied, and wherein for the selected group(s) for each order in that group each possible peak in the original array is checked to see if its delta-frequency wrt that order is or has a sub-order within the sideband range.

14. The method according to claim 1, further comprising determining the learned tolerances with artificial intelligence.

15. The method according to claim 1, further comprising associating with a clustering orders sub-algorithm which frequency members belong within a frequency group, wherein a dimensional cluster method performs removal of outsiders from the group, wherein the groupings by specific tolerances can be achieved by (i) histograms of reducing bin sizes for one or more groups, (ii) clustering of reducing size by removal of outsiders for a single group, (iii) multiple clusters for multiple groups, and wherein the outputs of Clusterorders and/or Remove-Subs sub-algorithms are arrays of individual order components sorted into identifiable groups(s).

16. The method according to claim 13, further comprising applying a OrdCIs sub-algorithm to determine an RSS of each group's orders and some order peak presence values and mean fundamental frequency, wherein a SideCIs sub-algorithm is applied to determine the RSS of each group's sidebands and also some sidebands peak presence values and mean sideband frequency, and wherein a groupCIs sub-algorithm is applied to determine the group RSS and the percentage of band relative CI value.

17. The method according to claim 15, wherein the search range for the fundamental frequency is for a first iteration centered around the expected frequency of a known mechanical vibration component and utilizing a low number of harmonics, then by clustering the results the most feasible cluster is used to calculate a significantly narrower search range and the number of harmonics increased for a second iteration, from which with or without the option of further clustering the identified peaks are removed from the peaks arrays prior to iterating claim 1 for defect frequencies.

18. The method according to claim 1, wherein the test for ignore sides includes a) the group has at least 2 "first" sideband components, and/or b) the group has at least 1 "first" sideband component AND 2 "second" sideband components, and wherein the outputs of ClusterSides and/or IgnoreSides functions are arrays of individual sideband components sorted into the same group(s) of the order component which is their "center-frequency.

19. The method according to claim 2, further comprising employing a Group Scalar Condition Indicator method to group patterns, wherein each measurement is traceable to a specific node and/or bearing and a timestamp along with the estimated shaft speed (RPM or Hz), non-specific measurement derived quantitative and qualitative scalar CIs are determined from two sources, first a waveform; such as but not limited to RMS, True-Peak, True-Peak2Peak, Crest Factor, Kurtosis, Skewness, % sinusoidal/harmonic activity, and two the spectrum; such as but not limited to RSS of various fixed bands as absolute and/or normalized to whole spectrum RSS, spectral Kurtosis, spectral Skewness, non-specific spectral harmonic indicator.

20. The method according to claim 17, further comprising employing a Search Band Scalar CIs method to group patterns, wherein each measurement has multiple search bands, to search for defect symptoms, wherein each search band provides an absolute RSS value of the spectral components within that band based on the speed provided, in effect a speed following band, and wherein a band RSS sub-algorithm is applied to calculate the RSS of the spectral band of interest as derived from the speed and bearing ranges and numbers of orders and sidebands.

21. The method according to claim 17, further comprising employing a Vector CIs method to group patterns, wherein for each identified group within a measurement, several CIs are extracted.

22. The method according to claim 18, further comprising using the most feasible group components to produce the relevant Condition Indicators both quantitative and qualitative which along with its fundamental and sideband frequencies is passed onto a (1) existing "post-sweep" logic with Design of Experiment derived parameters, (2) a "decision logic" with engineered or AI/ML learnt parameters or (3) AI or ML with trending or "pattern recognition" methods.

23. The method according to claim 1, wherein each peak can be assigned only to a one and only one group, names as "most feasible group," Wherein this groups is selected among others by a) the most probable combination of harmonics within the group and/or b) the fundamental being rotational speed frequency or other mechanical frequency c) a lower fundamental frequency, and wherein after selecting of the most feasible group, peaks assigned to this group are removed from other groups.

24. The method according to claim 22, wherein the frequencies are kept absolute to identify group patterns with static electrical fundamental frequencies and remove them from the peak arrays to keep only the speed following component, wherein when having multiple measurements with a varying rotational speed, only groups that are close to expected static noise frequencies are selected, wherein if such groups were detected in M out of N measurements, then those groups are considered as a static noise and can be removed from the further processing, and wherein the regular processing is then applied on the filtered data.

25. The method according to claim 1, wherein the fundamental frequency ranges for group identification start at a low frequency and are incrementally increased in steps where the range maximum does not exceed twice the range minimum and the next range step minimum does not exceed the previous maximum, and the peaks that satisfy group inclusions are removed from the peak arrays before the next range increment as to remove harmonics from lower fundamental frequencies being mistaken as belonging to a group with a higher fundamental frequency.

* * * * *